United States Patent [19]

Bronstert et al.

[11] Patent Number: 4,791,174
[45] Date of Patent: Dec. 13, 1988

[54] POLYMERS CONTAINING AMINO GROUPS, THEIR PREPARATION AND THEIR USE

[75] Inventors: Klaus Bronstert, Carlsberg; Daniel Wagner, Wachenheim, both of Fed. Rep. of Germany

[73] Assignee: BASF Aktiengesellschaft, Ludwigshafen, Fed. Rep. of Germany

[21] Appl. No.: 30,487

[22] Filed: Mar. 27, 1987

[30] Foreign Application Priority Data

Apr. 5, 1986 [DE] Fed. Rep. of Germany ....... 3611421

[51] Int. Cl.$^4$ .............................................. C08F 8/32
[52] U.S. Cl. ................... 525/274; 525/332.9; 525/333.2; 525/333.6; 525/366
[58] Field of Search ............... 525/332.9, 333.2, 333.6, 525/274

[56] References Cited

U.S. PATENT DOCUMENTS

| | | | |
|---|---|---|---|
| 3,109,871 | 11/1963 | Zelinski et al | 260/85.1 |
| 4,239,860 | 12/1980 | Hergenrother et al. | 525/374 |
| 4,396,745 | 2/1983 | Ikeguchi | 525/374 |
| 4,403,073 | 9/1983 | Ikeguchi | 525/374 |
| 4,552,928 | 11/1985 | Bauld et al. | 525/374 |
| 4,614,771 | 9/1986 | Watanabe et al. | 525/374 |
| 4,647,625 | 3/1987 | Aonuma et al. | 525/374 |

OTHER PUBLICATIONS

J. Polym. Sci., Polym. Chem. Ed. 15, (1977) 2401–2410.
Makromol. Chem. Rapid Commun. 3 (1982), 59–63.

*Primary Examiner*—Joseph L. Schofer
*Assistant Examiner*—Bernard Lipman
*Attorney, Agent, or Firm*—Keil & Weinkauf

[57] ABSTRACT

Homo- co- and/or block polymers which are modified with amino functional groups, are obtained from vinylaromatics and/or dienes and contain functional groups of the formulae (I) to (VI)

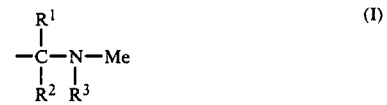

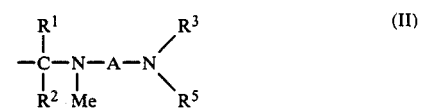

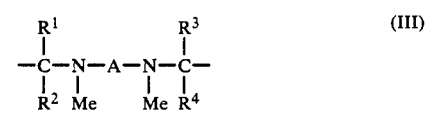

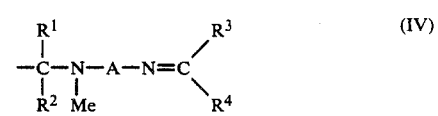

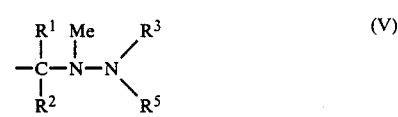

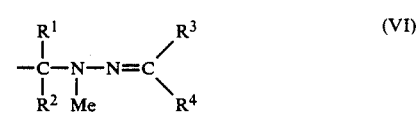

where N is nitrogen, $R^1$ and $R^4$ are each hydrogen, alkyl, cycloalkyl or aryl, $R^2$, $R^3$ and $R^5$ are each alkyl, cycloalkyl or aryl, Me is an alkali metal and A is an unsubstituted or substituted bridge which, in addition to carbon, may contain N or O members, a process for the preparation of the polymers from living anionically polymerized or alkali-metal-metallized homo-, co- and-/or block copolymers from vinylaromatics and/or dienes, which are reacted with appropriate nitrogen compounds in the presence of a polar or nonpolar solvent, and the conversion of the polymers as claimed in claim 1 for the preparation of similar polymers by hydrolysis, alcoholysis and/or hydrogenation.

4 Claims, No Drawings

POLYMERS CONTAINING AMINO GROUPS, THEIR PREPARATION AND THEIR USE

The present invention relates to copolymers and/or block copolymers which are modified with amino functional groups and are obtained from vinylaromatics and/or dienes, their preparation from living anionically polymerized or alkali-metal-metallized homopolymers, copolymers and/or block copolymers of vinylaromatics and/or dienes, and their use for the preparation of similar polymers by hydrolysis or alcoholysis.

Polymers of this type are compounds having weight average molecular weights $\overline{M}_w$ of from 400 to 500,000, preferably from 2,000 to 400,000, and containing functional groups and/or terminal groups randomly distributed over the polymer molecules and/or at the chain ends.

Polymers which are modified with functional groups and are obtained from vinylaromatics and/or dienes, and their preparation from the corresponding living, anionically polymerized or alkali-metal-metallized polymers have long been known. Accordingly, there is a large number of electrophilic substances which not only terminate living polymer chains but insert a functional group into the polymer. For example, polymers containing hydroxyl, carboxyl, thiol or halogen groups can be prepared by reacting living polymers with compounds such as epoxides, aldehydes, ketones, carbon dioxide, anhydrides, cyclic sulfides, disulfides or halogens. On the other hand, polymers substituted by primary or secondary amino groups cannot be prepared by reaction with primary or secondary amines, since the latter simply result in termination of living polymers by proton transfer.

Only tertiary amino groups can be introduced by reaction with N,N-disubstituted aminoaldehydes or amino ketones, such as p-N,N-dimethylaminobenzaldehyde (cf. U.S. Pat. No. 2,109,871).

The preparation of polydienes containing primary amino groups using catalysts having a protected amino function, e.g. p-lithium-N,N-bis(trimethylsilyl)-aniline, is described by D. N. Schulz and A. F. Halasa in J. Polym. Sci., Polym. Chem. Ed. 15 (1977), 2401–2410. The fact that the use of this process is restricted is essentially due to the poor solubility of the modified initiators in nonpolar hydrocarbon solvents. However, the unavoidable use of polar solvents, such as diethyl ether, in the Example cited is known to have an adverse effect on the microstructure of the diene polymers.

R. Koenig et al., Europ. Polym. J. 3 (1967), 723–731, reports that the deactivation of anionic living polystyrene by benzylideneaniline leads to polymers having secondary aromatic amino terminal groups. The authors come to the conclusion that the reactivity of the carbon-nitrogen double bonds toward polystyryl carbanions permits quantitative conversion only in a polar solvent.

The synthesis of polymers containing primary amino groups by reacting anionic living polymers with protected aminating reagents, such as N-trimethylsilylbenzylideneamine, has been described by A. Hirao et al. in Makromol. Chem. Rapid Commun. 3 (1982), 59–63.

The disadvantage of these known processes for introducing amine groups into polymers is that these processes frequently take place with sufficiently high yield only when a several-fold excess of aminating reagent is used, so that the amine-modified polymers are contaminated by inert byproducts.

Furthermore, the trimethylsilyl radical has to be eliminated from the reaction products in an additional reaction. The resulting byproduct, trimethylsilanol, is difficult to remove.

Finally, U.S. patent application Ser. No. 889,372 has proposed preparing polymers containing terminal amino groups by reacting living polymers containing lithium metal with diaziridines. Very specific reagents are required in this case.

It is an object of the present invention to provide, in a definite reaction which takes place with high conversion, polymers of vinylaromatics and/or dienes containing one or more amino groups and/or terminal groups. It is a further object of the present invention to carry out the reaction, where appropriate, in nonpolar solvents, in particular in an aliphatic, cycloaliphatic and/or aromatic hydrocarbon using a stoichiometric amount or a slight excess of a readily available aminating reagent. It is a further object of the present invention to obtain the polymers containing amino groups by a simple method.

We have found that this object is achieved by polymers as claimed in claims 1 to 7, a process for the preparation of such polymers according to claim 8 and the use of the polymers as claimed in claims 9 and 10.

In the process according to the invention, polymers containing organometallic groups are reacted with compounds which contain one or more —C=N— double bonds and in which the nitrogen must not be bonded to a proton or oxygen.

Examples of suitable compounds are Schiff's bases, hydrazones of asymmetrically disubstitued alkyl- and/or arylhydrazines or azines.

Particularly suitable compounds for introducing amino groups into anionically polymerizable, living polymers are aldimines obtained from linear or branched aliphatic aldehydes and linear or branched aliphatic, cycloaliphatic or aromatic primary amines, e.g. butylidenebutylamine, butylideneisopropylamine, isobutylidenepropylamine, isobutylidene-tert-butylamine, isobutylidenecyclohexylamine, isobutylideneaniline, etc., and aldimines obtained from cycloaliphatic, heterocyclic, if appropriate further substituted and/or aromatic aldehydes and linear or branched aliphatic, cycloaliphatic, heterocyclic and/or aromatic amines, e.g. cyclohexylideneisopropylamine, benzylidene-n-propylamine, benzylidenecyclohexylamine benzylideneaniline, benzylidene-m-trifluoromethylaniline, furfurylideneaniline, benzylidene-N,N-dimethylaminoethylenediamine, cyclohexylidene-N,N-diethylaminohexamethylenediamine, etc.

The polymers containing organometallic groups can also be reacted with the bifunctional and/or polyfunctional Schiff's bases, eg. diisopropylideneethylenediamine, dibenzylideneethylenediamine, diisobutylidenehexamethylenediamine, dibenzylidenepropylenediamine, etc. These compounds are also suitable as coupling agents.

The bifunctional or polyfunctional Schiff's bases can be prepared from various aldehydes and/or ketones and used for the reaction. Examples are N-isobutylidene-N'-benzylideneethylenediamine and N-acetonyl-N'-benzylidenehexamethylenediamine.

Other suitable compounds for introducing amino groups into anionically polymerizable, living polymers are symmetric or asymmetric aldazines or ketazines, eg.

acetaldazine, butyraldazine, benzaldazine, acetonazine, phenylacetaldehydebutanonazine, pyridine-2-aldazine or benzophenonazine.

Other reagents which can be used for introducing functional groups or the condensates of asymmetrically disubstituted alkyl- and/or arylhydrazines and aldehydes or ketones, eg. isobutyraldehyde-N,N-dimethylhydrazone, benzaldehyde-N,N-dimethylhydrazone, isobutyraldehydediphenylhydrazone, etc.

Anionically polymerized living polymers can also be reacted with condensates of linear or branched aliphatic, cycloaliphatic or aromatic ketones, such as acetone, ethyl methyl ketone, 3-pentanone, cyclohexanone, acetophenone or benzophenone, and primary amines, namely with ketimines, the yields being lower.

This list is not complete and is not intended to constitute any restriction.

Suitable processes for the preparation of compounds of the aldimine, ketimine, diimine, hydrazone and azine type are known and are described and reported in detail in, for example, Methoden der organischen Chemie (Houben-Weyl), Volume XI/2 (4th Edition) (1958), page 77 et seq; Volume X/2, 4th Edition (1967), page 89 et seq; Volume VII/1, 4th Edition (1954), page 455 et seq and 461 et seq.

For the purposes of the present invention, homo-, co- and block copolymers of vinylaromatics and/or dienes are the known polymers of this type which can be obtained by anionic polymerization of the corresponding monomers, for example with the aid of organo-alkali metal initiators. Processes of this type are sufficiently well known to require no further discussion here (cf. for example British Pat. No. 1,444,680 or J. Appl. Polym. Sci. 22 (1978), 2007-2013).

Particularly suitable vinylaromatics are styrene, the various alkylstyrenes and vinylnaphthalene, and particularly suitable dienes are butadiene, isoprene, 2,3-dimethylbutadiene, piperylene, phenylbutadiene and other anionically polymerizable conjugated $C_4$-$C_{12}$-dienes. In addition to the particular homopolymers, the copolymers and the known block copolymers of vinylaromatics and dienes are also suitable, block copolymers or random copolymers being obtained, depending on the choice of initiator and procedure.

The novel polymers containing the functional groups (I-VI) are prepared by a known process from either living anionically polymerized or alkali-metal-metallized homo-, co- and/or block copolymers of vinylaromatics and/or dienes.

For this purpose, the monomers are subjected to anionic polymerization in the presence of alkali metals or their alkyl or aryl derivatives, in particular the alkyl derivatives of lithium, such as sec-butyllithium, in an inert solvent, such as an aliphatic, cycloaliphatic or aromatic hydrocarbon, in particular hexane, cyclohexane, benzene or toluene, or in the presence of tetrahydrofuran.

Other suitable polymerization initiators are multifunctional alkali metal-containing compounds, as described, for example, in EP-A-1977 or by F. Bandermann et al. in Makromol. Chem. (1985), 186, 2017-2024.

These processes give polymers which contain metal bonded to the terminal groups. However, it is also possible to prepare homo-, co- and/or block copolymers of vinylaromatics and/or dienes and subsequently to metallize the said polymers with alkali metals or their derivatives. Metallized polymers of this type contain the organometallic groups randomly distributed along the chain.

Processes for metallizing unsaturated polymers and reacting the resulting metallized polymers with reactive chemical compounds are also described in U.S. Pat. Nos. 3,781,260 and 3,976,628.

According to the invention, the above organometallic polymers are reacted with nitrogen compounds of the general formulae (VII to XI) in the presence of a solvent. Preferred solvents are aliphatic, cycloaliphatic and aromatic hydrocarbons, such as hexane, cyclohexane, benzene, toluene, etc. The reaction is carried out in the absence of water and in an inert atmosphere, for example under pure nitrogen, at from $-70°$ to $100°$ C., preferably from $0°$ to $60°$ C.

The reaction with the aldimines takes place at a particularly high rate and with a particularly high yield. Thus, living polymer solutions which contain terminal styryl carbanion groups and have an intense orange red color can be titrated with equimolar amounts until the color vanishes.

It is an advantage that, when they are used as aminating reagents, frequently no excess or only a slight excess is required, so that the converted polymers are scarcely contaminated by unconverted nitrogen compounds.

The reaction with the bifunctional Schiff's bases leads to virtually completely coupled, partially coupled or virtually completely uncoupled polymers, depending on the molar ratio of the chain terminating reagent to the living chain ends or metallized groups.

The novel polymers possessing the functional groups (I to III, V) can be used for the preparation of similar polymers containing the functional groups (XII, XIII, XIV and XVI) if they are reacted with an amount of water or alcohol equivalent to the alkali metal, the latter being exchanged for hydrogen. This reaction takes place spontaneously when water or an alcohol is added, lithium hydroxide or alcoholate also being formed.

The novel polymers possessing the functional groups (IV) and (VI) can be converted to polymers having the functional groups of the general formulae (XV and XVII) by hydrolysis, if appropriate with acid catalysis, and elimination of an aldehyde or keto group.

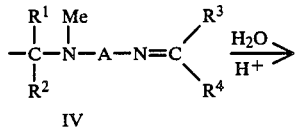

IV

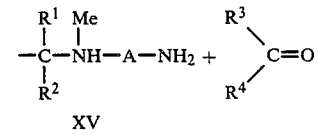

XV

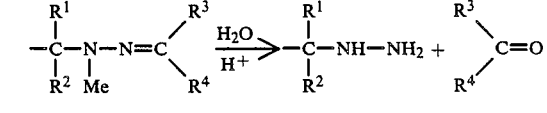

VI          XVII

This gives polymers which carry a primary or secondary amino group.

The novel polymers possessing the functional groups (XII–XVII) can also be converted, by hydrogenation, to polymers in which some or all of the aliphatic unsaturated bonds are saturated.

The hydrogenation is preferably carried out using molecular hydrogen and catalysts based on metals of Group 8 of the Periodic Table or salts of these metals. It may be effected in the heterogeneous phase, for example with Raney nickel, or in the homogeneous phase using catalysts based on salts, in particular the carboxylates, alkoxides or enolates of cobalt, of nickel or of iron, which are combined with metal-alkyls, in particular aluminumalkyls.

The examples which follow illustrate the invention.

The compounds used for the Examples were prepared by condensation of equimolar amounts of primary amines or asymmetrically substituted hydrazines, or semiequimolar amounts of aliphatic diamines and hydrazine with the appropriate aldehydes or ketones by the known standard methods (cf. literature cited). In some cases, the water formed was distilled off as an azeotrope in order to complete the reaction. The compounds were then purified by distillation, if necessary under reduced pressure, and had the following properties:

1. isobutylidenepropylamine ($C_7H_{15}N$) formula weight: 113 bp. 1000 mbar, 115° C.

| Content of (%) | C | H | N |
| --- | --- | --- | --- |
| Theory | 74.33 | 13.27 | 12.38 |
| Analysis | 74.2 | 13.3 | 12.4 |

2. furfurylidenepropylamine ($C_8H_{11}NO$) formula weight: 137 bp. 4 mbar, 55° C.

| Content of (%) | C | H | N |
| --- | --- | --- | --- |
| Theory | 70.04 | 8.08 | 10.21 |
| Analysis | 69.9 | 8.1 | 10.0 |

3. furfurylideneaniline ($C_{11}H_9NO$) formula weight: 171 bp. 1 mbar, 115°–120° C.

| Content of (%) | C | H | N |
| --- | --- | --- | --- |
| Theory | 77.17 | 5.37 | 8.18 |
| Analysis | 76.8 | 5.4 | 8.3 |

4. benzylideneaniline ($C_{13}H_{11}N$) formula weight: 181 bp. 2 mbar, 155° C. mp. 53° C.

| Content of (%) | C | H | N |
| --- | --- | --- | --- |
| Theory | 86.15 | 6.12 | 7.73 |
| Analysis | 86.1 | 6.2 | 7.8 |

5. benzylidenepropylamine ($C_{10}H_{13}N$) formula weight: 147 bp. 2 mbar, 74° C.

| Content of (%) | C | H | N |
| --- | --- | --- | --- |
| Theory | 81.59 | 8.9 | 9.51 |
| Analysis | 81.2 | 8.9 | 9.8 |

6. benzylidenedimethylaminoethylenediamine ($C_{11}H_{16}N_2$) formula weight: 176 bp. 2 mbar, 100°–105° C.

| Content of (%) | C | H | N |
| --- | --- | --- | --- |
| Theory | 75.05 | 9.2 | 15.8 |
| Analysis | 75.0 | 9.1 | 15.9 |

7. dibenzylidene-1,3-diamineopropane ($C_{17}H_{18}N_2$) formula weight: 250, bp. 1 mbar, 153° C.

| Content of (%) | C | H | N |
| --- | --- | --- | --- |
| Theory | 81.56 | 7.25 | 11.19 |
| Analysis | 81.5 | 6.8 | 11.3 |

8. diisobutylidene-1,6-diaminohexane ($C_{14}H_{28}N_2$) formula weight: 224.4, bp. 2 mbar, 106°–110° C.

| Content of (%) | C | H | N |
| --- | --- | --- | --- |
| Theory | 74.94 | 12.58 | 12.48 |
| Analysis | 73.9 | 12.4 | 12.2 |

9. benzaldehyde-N,N-dimethylhydrazone ($C_9H_{12}N_2$) formula weight: 148, bp. 3 mbar, 94° C.

| Content of (%) | C | H | N |
| --- | --- | --- | --- |
| Theory | 72.94 | 8.16 | 18.9 |
| Analysis | 72.6 | 8.0 | 19.0 |

10. isobutyraldazine ($C_8H_{16}N_2$) formula weight: 140 bp. 1000 mbar, 153° C.

| Content of (%) | C | H | N |
| --- | --- | --- | --- |
| Theory | 68.57 | 11.42 | 20 |
| Analysis | 68.6 | 11.4 | 19.8 |

11. tris[isobutylidene-(2-aminoethyl)-amine] ($C_{18}H_{36}N_4$) formula weight: 308.3, bp. 2 mbar, 165° C.

| Content of (%) | C | H | N |
| --- | --- | --- | --- |
| Theory | 70.08 | 11.76 | 18.16 |
| Analysis | 69.9 | 11.6 | 18.1 |

EXAMPLE 1

500 ml of cyclohexane and 52 g (0.5 mole) of styrene are introduced into a thermostatable 2 liter reaction vessel which has been flushed under pure nitrogen with a solution of n-butyllithium in cyclohexane and is provided with a stirrer and a thermometer and closed gastight with a silicone membrane. A 1.4 molar solution of sec-butyllithium in cyclohexane is added to the styrene solution at 40° C. by means of an injection syringe with thorough stirring until a permanent pale yellow coloration is formed. A further 10 millimoles of sec-butyllithium are then added. The solution, which now has an intense orange color warms up. The polymerization is complete after one hour. The solution is titrated with benzylidenepropylamine using an injection syringe. After 1.5 g (about 0.01 mole) of aminating reagent have been added, the organe color vanishes. The solution is kept at 40° C. for a further 15 minutes. The polymer is precipitated by pouring the solution into 5 l of ethanol, with thorough stirring until a permanent pale yellow coloration is formed. A further 10 millimoles of sec-butyllithium are then added. The solution, which now has an intense orange color warms up. The polymerization is complete after one hour. The solution is titrated with benzylidenepropylamine using an injection syringe. After 1.5 g (about 0.01 mole) of aminating reagent having been added, the orange color vanishes. The solution is kept at 40° C. for a further 15 minutes. The polymer is precipitated by pouring the solution into 5 l of ethanol, with thorough stirring. The product is filtered off and dried at 60° C. under reduced pressure, after which the following analytical data are examined for the white polystyrene powder: Weight average molecular weight $\overline{M}_w$: 5000, determined by GPC which was calibrated using standard polystyrenes having a narrow distribution. Basic nitrogen determined by potentiometric titration with perchloric acid in a chlorobenzene/glacial acetic acid mixture: 0.26% by weight. Total nitrogen determined by the Kjeldahl method: 0.25% by weight (theory: 0.28% of N).

EXAMPLES 2 TO 8

Living polystyrenes are prepared and reacted with the above nitrogen compounds, these steps being carried out as described in Example 1.

Table 1 provides information about the type and amount of reagents used for introducing functional groups, and the analytical data determined for the precipitated and dried polymers.

The overview shows that the aldimines give particularly high yields when amino groups are introduced into living polymers. The reaction with the bifunctional Schiff's bases (Examples 4 and 5) give virtually completely coupled, partially coupled and, where a (twofold) excess is used, virtually completely uncoupled polymers, dependihg on the molar ratio of chain terminating reagent to living chain ends.

Reaction of living chain ends with aldazines (Example 8) still gives satisfactory yields in the functionalization reaction under the chosen conditions.

The reaction with substituted hydrazones and ketimines gives only moderate yields under the chosen conditions.

ing mantle is cleaned by boiling in it a solution of 3 cm³ of sec-butyllithium in cyclohexane under pure nitrogen.

After the solution has been discharged, the reactor is charged with 3000 cm³ of cyclohexane and 850 g of isoprene (purified over Ca hydride). Polymerization is carried out with 25 millimoles of sec-butyllithium at from 65° to 75° C. with the formation of a living polyisoprene. After the polymerization is complete, 2 cm³ of styrene are added. After a further hour, titration is carried out with 3.5 g ($\hat{=}$30 millimoles) of isobutylidene-n-propylamine until the color vanishes.

$\overline{M}_w$ determined by GPC (gel permeation chromatography) is 36,000. The nitrogen content determined by the Kjeldahl method is 0.035% by weight (theory: 0.038% by weight).

EXAMPLE 10

In order to prepre a 2-block copolymer from 17% by weight of styrene and 83% by weight of butadiene, 0.9 mole (93.6 g) of styrene in 3000 cm³ of cyclohexane is initially taken in the apparatus described in Example 2. With the aid of an injection syringe, a solution of sec-butyllithium is metered in at 40° C. until a pale yellow coloration indicates that all impurities have been consumed. Thereafter, 12 millimoles of sec-butyllithium are added and the styrene is completely polymerized in the course of one hour at 65° C. 10.2 moles of butadiene which has been purified by distilling off butyllithium is then run in a little at a time at this temperature. One hour after the feed is complete, a further 2 cm³ of styrene are added. The solution, which is virtually colorless during the polymerization of the butadiene, assumes an orange coloration after a further hour at 65° C. With the aid of an injection syringe, the solution is then titrated with 2.2 g (12.5 millimoles) of benzylidenedimethylaminoethylenediamine until the color vanishes. The precipitated and dried polymer has the following analytical data.

$\overline{M}_w$ determined by GPC methods: 55,000. Total nitrogen determined by the Kjeldahl method: 0.047% by weight.

Basic nitrogen determined by potentiometric titration: 0.046% by weight (theory 0.05% by weight).

TABLE 1

| Example | Aminating reagent (A) | (A)/Li[a] [mol. ratio] | $\overline{M}_w$[b] [GPC] | $\overline{M}_w$[c] [GPC] | VN[d] [cm³ g⁻¹] | BAS.-N[g] (% by wt.) | TOT.-N[h] (% by wt.) | N content (theory) | % of theory [yield] |
|---|---|---|---|---|---|---|---|---|---|
| 2 | benzylidenedimethylaminoethylenediamine | 1.2 | 4500 | 4500 | 6.6 | 0.54 | 0.54 | 0.62[e] | ~87 |
| 3 | butylidene-n-propylamine | 1.2 | 5000 | 5000 | 7.1 | 0.26 | 0.25 | 0.28[f] | ~92 |
| 4 | dibenzylidene-1,3-diaminopropane | 0.5 | 5000 | 10000 | 9.6 | 0.26 | 0.25 | 0.28[e] | ~92 |
| 5 | diisobutylidene-1,6-diaminohexane | 2 | 5000 | 5000 | 6.8 | 0.47 | 0.47 | 0.56[e] | ~84 |
| 6 | diethylideneaniline | 1.2 | 5500 | 5500 | 8.1 | 0.09 | 0.082 | 0.25[f] | ~34 |
| 7 | benzaldehyde-N,N—dimethylhydrazone | 1.2 | 5000 | 5000 | 7.1 | 0.21 | 0.23 | 0.56[e] | ~40 |
| 8 | i-butyraldazine | 1.2 | 4500 | 4500 | 6.6 | 0.38 | 0.39 | 0.62[e] | ~63 |

[a]Molar ratio: aminating reagent/initiator
[b]Mean molecular weight: ... before the reaction
[c]Mean molecular weight: ... after the reaction
[d]Viscosity number measured in toluene at 25° C. (polymer concentration 0.5 gdl⁻¹) after the reaction
[e]Calculated for 2 N atoms per molecule
[f]Calculated for 1 N atom per molecule
[g]Basic nitrogen, determined by potentiometric titration
[h]Total nitrogen, determined by the Kjeldahl method

EXAMPLE 9

A 6 liter reactor equipped with a stirrer, a thermometer, a reflux condenser, a silicone membrane and a heat-

EXAMPLE 11

In order to produce a telechelic polymer having two terminal amino groups, a bifunctional organolithium initiator is first prepared. U.S. Pat. No. 4,172,100 discloses that the adduct of 1,3-bis-(1-phenylethenyl)benzene and sec-butyllithium is a bifunctional initiator which is readily soluble in hydrocarbons.

1,3-bis-(1-phenylethenyl)-benzene is prepared as described in Example 1 of the cited Patent and used for the preparation of the initiator solution, without further purification by recrystallization.

4.5 millimoles of 1,3-bis-(1-phenylethenyl)benzene are dissolved in 200 ml of purified cyclohexane, and 10 millimoles of sec-butyllithium are added in the absence of moisture and under pure nitrogen. After 2 hours at 60° C., the content of the reaction vessel has assumed a dark red coloration.

500 g of butadiene which has been purified by distilling off butyllithium is first introduced into 3000 cm³ cyclohexane in the apparatus described in Example 2. Thereafter, the solution of 1,3-phenylene-bis-(3-methyl-1-phenylpentylidene)-bis-lithium in cyclohexane, which is described above, is added with the aid of an injection syringe, and the reactor content is polymerized while the temperature is slowly increased to 60° C. Polymerization is complete after about 180 minutes. 1.5 g ($\hat{=}$0.011 mole) of benzylidene-n-propylamine are added to the reaction solution.

After a further 20 minutes, the polymer is precipitated in ethanol, washed and dried.

The molecular weight $\overline{M}_w$ of the polymer was determined as 56,000 by gel permeation chromatography.

Total nitrogen content determined by the Kjeldahl method: 0.046% by weight. Basic nitrogen determined by potentiometric titration: 0.045% by weight (theory: 0.05% by weight).

The analytical data show that the resulting polymer possesses amino functional groups at both ends.

EXAMPLE 12

In order to produce a coupled polymer, a polystyrene capable of growth and having a number average molecular weight of 10,000 is first prepared, in an apparatus similar to that described in Example 1, from 52 g of styrene, dissolved in 500 ml of cyclohexane, and sec-butyllithium under pure nitrogen at 50° C.

When the polymerization is complete, 10 ml of solution are removed from the reaction vessel by means of an injection syringe, for analytical purposes.

The intense orange solution is then titrated with ⅓ equivalent of tris[isobutylidene(2-aminoethyl)amine]per Li atom until the color vanishes, and the coupling reaction is continued for a further 30 minutes.

The polymer is precipitated in 5 l of ethanol with thorough stirring, filtered off, and dried at 60° C. under reduced pressure.

The following analytical data are determined for the polymer:

| | |
|---|---|
| (1) Molecular weight of the linear polystyrene (GPC) | 11,000 |
| (2) M (peak) of the coupled polystyrene (GPC) | 28,000 |
| (3) Yield in the coupling reaction | 75% |
| (4) Total nitrogen determined by the Kjeldahl method (coupled PS) | 0.23% by weight |
| Basic nitrogen determined by potentiometric titration (coupled PS) (Theory: 0.24%) | 0.18% by weight |

The analytical data show that a polymer which contains amino functional groups and possesses three chain ends is formed in high yield.

We claim:

1. A homopolymer, copolymer or block copolymer, or mixtures thereof, which is composed of vinylaromatic, dienes or mixtures thereof and additionally contains at least one as functional groups, groups of the formulae (I) to (VI)

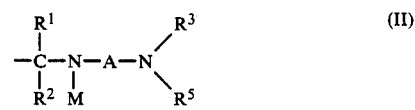

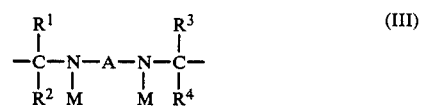

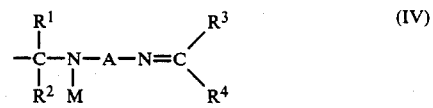

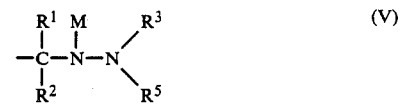

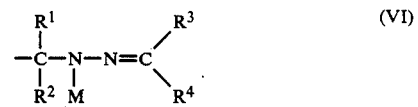

where N is nitrogen, $R^1$ and $R^4$ are each hydrogen, alkyl, cycloalkyl or aryl, $R^2$, $R^3$ and $R^5$ are each alkyl, cycloalkyl or aryl, M is an alkali metal and A is an unsubstituted or substituted polymethylene bridge containing 2 to 12 $CH_2$ groups, or is a cycloaliphatic bridge or a phenylene bridge.

2. A polymer as defined in claim 1, which contains on average from 1 to 10 of the functional groups (I to VI) per macromolecule.

3. A polymer as defined in claim 1, wherein alkyl is $C_1$-$C_{12}$-alkyl, cycloalkyl is $C_5$-$C_8$-cycloalkyl and aryl is $C_6$-$C_{12}$-aryl.

4. A polymer as defined in claim 1, wherein the bridge A carried methyl, ethyl, phenyl or alkylideneamino groups as substituents.

* * * * *